United States Patent [19]

Mason, Jr

[11] 3,972,556

[45] Aug. 3, 1976

[54] TRACTOR-TRAILER AERODYNAMIC DRAG REDUCER

[75] Inventor: William T. Mason, Jr, Lake Orion, Mich.

[73] Assignee: General Motors Corporation, Detroit, Mich.

[22] Filed: Oct. 15, 1974

[21] Appl. No.: 514,638

[52] U.S. Cl. ................................ 296/1 S; 105/2 R
[51] Int. Cl.² .......................................... B60J 9/00
[58] Field of Search .............. 296/1 S, 91; 105/2 R, 105/2 A, 2 B

[56] References Cited
UNITED STATES PATENTS

| | | | |
|---|---|---|---|
| 3,348,873 | 10/1967 | Saunders | 296/1 S |
| 3,514,023 | 5/1970 | Russell et al. | 296/1 Z |
| 3,596,974 | 8/1971 | Adams | 296/91 |
| 3,695,673 | 10/1972 | Meadows | 296/1 S |
| 3,731,969 | 5/1973 | Bildfell | 296/1 S |
| 3,794,372 | 2/1974 | Webb | 296/1 S |

*Primary Examiner*—L. J. Paperner
*Assistant Examiner*—Donald W. Underwood
*Attorney, Agent, or Firm*—C. E. Leahy

[57] ABSTRACT

A device for reducing the aerodynamic drag on a tractor-trailer is mounted on the tractor roof and includes a upwardly inclined rearwardy extending top surface having its leading edge faired into the tractor roof. The device has sidewalls which extend generally vertically to connect the outer edge of the top surface of the device with the roof of the tractor. The width of the device is substantially less at its leading edge than at its trailing edge. The vertical sidewalls connecting the tractor roof and the top surface may follow a linear, convex, or concave-convex path as they progress from front to rear and function to provide airflow streamlining around the trailer sides. The invention provides formulas by which the angle of rearward inclination for the optimum streamlining of airflow over the trailer roof may be calculated. Formulas are provided for devices having a top surface of either planar or curvilinear configuration.

4 Claims, 6 Drawing Figures

TRACTOR-TRAILER AERODYNAMIC DRAG REDUCER

The invention relates to a drag reducing device for improving the aerodynamic characteristics of a tractor-trailer vehicle.

Conventional tractor-trailer vehicles have a trailer body of height greater than the height of the tractor. Furthermore, the front wall of the trailer body is spaced somewhat behind the rear wall of the tractor cab.

It is known that the aerodynamic drag of a bluff body will generally be greater if the air flow is separated from the body in such a manner as to increase the effective frontal area of the body.

It is also known that the configuration of conventional tractor-trailer vehicles results in such regions of separated airflow over the forward upper sides of the trailer and the forward portion of the trailer roof. It is also known that large areas of high static pressure act over the front face of the tractor and the exposed front wall of the trailer above the tractor roof. There is also a strong downflow between the tractor and trailer which acts to extend the high pressure area on the front wall of the trailer to a point below the tractor roof.

The present invention provides an improved device for reducing tractor-trailer aerodynamic drag. According to the invention the aerodynamic drag reducer includes an air deflecting device mounted on the tractor roof and having its leading edge faired into the leading edge of the tractor roof. The device has a top surface which is rearwardly inclined and extends rearward toward the trailing edge of the tractor roof. The invention provides formulas by which the angle of rearward inclination providing the optimum aerodynamic drag reduction may be determined. The rearward inclination of the device's upper surface at this optimum angle directs the airflow smoothly over the roof of the trailer to eliminate the high static pressure area on the front of the trailer and eliminate the strong downflow between the tractor and trailer, thus providing a reduction in the aerodynamic drag of the tractor trailer. Formulas are provided for top surfaces of either planar or curvilinear configuration.

The invention also provides a planform profile for the device. A generally vertical wall is provided to connect the outer edge of the top surface of the device with the roof of the tractor. The width of the device is substantially less at its leading edge than at its trailing edge. The vertical wall connecting the tractor roof and the device may follow a linear, convex, or concave-convex path as it progresses from front to rear. The function of this planform shaping is to direct the airflow smoothly around the upper sides of the trailer. The pressures acting over the front of the tractor as well as the pressures acting on the device's top surface are then lower than would be the case with no planform shaping. The aerodynamic drag of the vehicle is reduced correspondingly. The planform shaping is especially beneficial when the vehicle encounters sidewinds.

One feature of the invention is a drag reducing device for a tractor roof which need not extend rearwardly of the tractor cab, thereby obviating the possibility of interference with the trailer during the turning of the tractor-trailer.

Another feature of the invention is the provision of formulas for determining the angle of rearward inclination of a tractor roof-mounted device which provides optimum aerodynamic drag reduction.

A further feature of the invention is the provision of improved planform configurations for a tractor roof-mounted device to direct the oncoming airflow smoothly around the forward upper sides of the trailer and to maintain a significant drag reduction when sidewinds are encountered.

A still further feature of the invention is the provision of a drag reducing device which effects substantial drag reductions in vehicles employing tractors with either cab-over-engine, sleeper cab-over-engine, or the more conventional cab-behind-engine configuration.

These and other objects, features, and advantages of the invention will become apparent upon consideration of the specification and the appended drawings in which.

Figure 1:
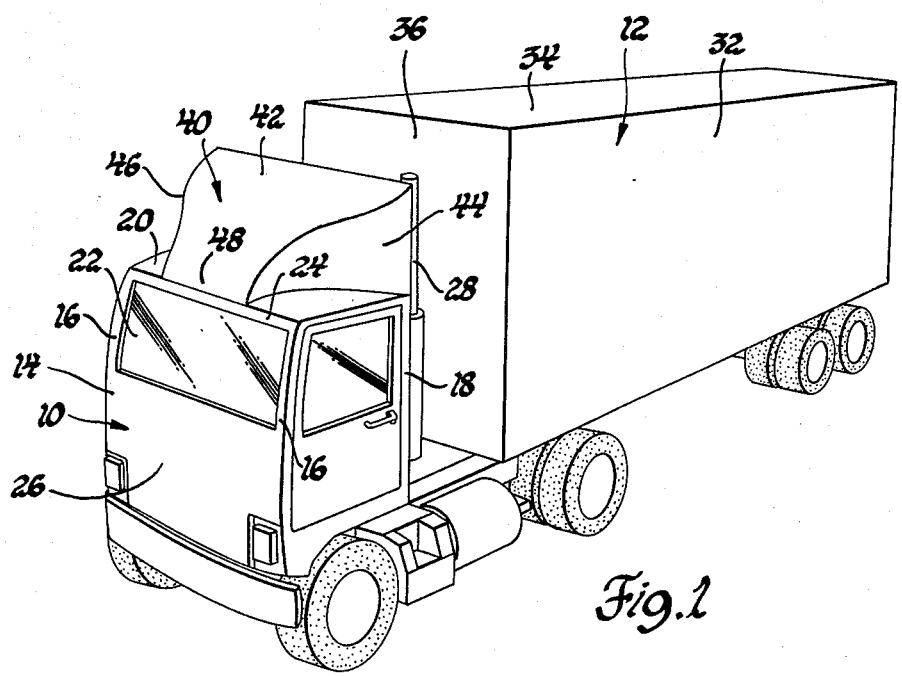
FIG. 1 is a perspective view of a tractor-trailer vehicle having a drag reducing device according to the invention.

Referring to FIG. 1 a conventional tractor-trailer vehicle includes a tractor 10 and a trailer 12. The tractor 10 has a non-sleeper cab-over-engine configuration but alternatively could be a sleeper cab-over-engine or a conventional configuration. The cab 14 of the tractor 10 includes windshield pillars 16 and rear pillars 18 which support the cab roof 20. The windshield 22 is flush with the windshield pillars 16, a windshield header 24 and a front panel 26 of the cab 14 so that the front of the cab 14 presents a bluff contour to the approaching airstream.

The conventional trailer 12 has a rectangular shape and includes sides 32, a roof 34, and a front wall 36. The cab 14 of the tractor 10 and the front wall 36 of the trailer 12 are spaced longitudinally of one another so that the tractor 10 can turn relative to the trailer 12. The roof 20 of the tractor 10 is at a lower elevation than the roof 34 of the trailer 12.

As seen in FIG. 1, a three-dimensional drag reducing device 40 is mounted on the tractor roof 20. The drag reducing device 40 is generally wedge shaped and includes a top surface 42 for directing airflow over the top of the trailer, and laterally spaced sidewalls 44 and 46 for directing airflow around the upper sides of the trailer. The leading edge 48 of the device is faired into the windshield header 24. The top surface 42 of the device 40 is upwardly and rearwardly inclined and diverges from the tractor roof 20 as it extends rearwardly to the rear of the cab roof 20. The leading edge 48 of the shield 40 is of lesser width than the width of the cab 14, resulting in an outward divergence of the sidewalls 44 and 46 as they extend rearwardly to the rear of the cab roof 20. The top surface 42 and the sidewalls 44 and 46 of the drag reducing device 40 are truncated at the rear edge of the cab roof 20 so as not to interfere with exhaust and/or air stacks 28 or interfere with the front wall 36 of the trailer 12 as the tractor 10 turns relative to the trailer 12. The drag reducing device 40 may, if desired have a rear vertically extending wall which connects the top surface 42, the sidewalls 44 and 46 and the tractor roof 20. It will be apparent that the drag reducing device 40 may be of sheet metal, fiber glass, or equivalent construction and would also have a structural framework contained therein which would support the air flow diverting surfaces thereof against the air pressure and vibratory stresses which would be encountered during high speed operation of the tractor-trailer vehicle. The drag reducing device may be an add-on device or it may be integrally designed into the shape of the tractor cab.

Figure 2:
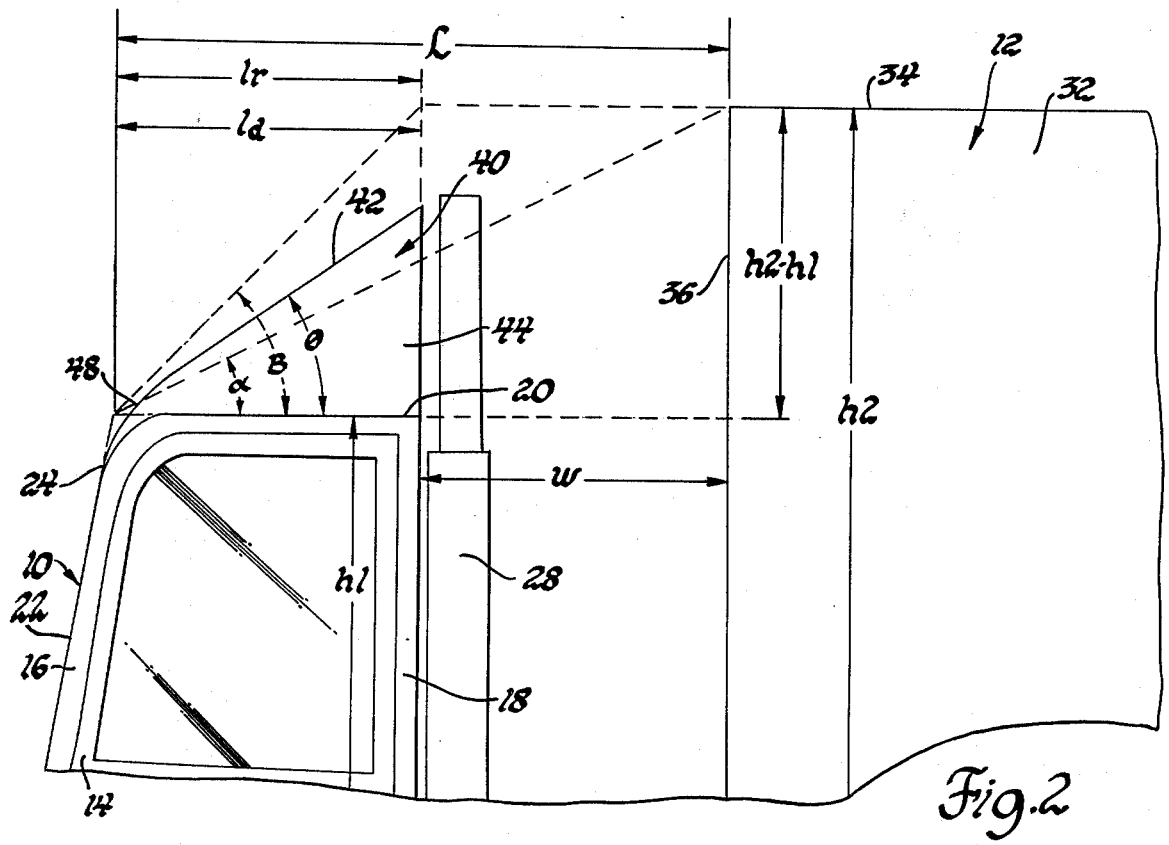
FIG. 2 is a partial side elevation view of the tractor-trailer of FIG. 1.

Referring to FIG. 2, there is shown a side elevation view of the tractor-trailer of FIG. 1. The various dimensional parameters of the tractor-trailer and the drag reducing device 40 are labeled in FIG. 2 and include: (h1), height of the tractor roof 20 above ground; (h2), height of the trailer roof 34 above ground; (h2–h1), the height of the trailer front wall 36 exposed above the tractor roof 20; (L), distance from the leading edge 48 of the device 40 to trailer front wall 36; ($l_r$), length of the tractor roof 20; ($l_d$), length of the drag reducing device 40; (w), the gap distance between cab 14 and front wall 36; alpha ($\alpha$), the angle whose tangent is (h2–h1)/(L); and beta (B), the angle whose tangent is (h2–h1)/($l_d$); and, theta ($\theta$), the angle of inclination of the top surface 42 of the drag reducing device 40. Since the windshield header is usually curved, the dimensions L, $l_r$ and $l_d$ are measured from the point where an upward projection of the windshield surface 22 intersects with a forward projection of the roof 20.

The optimum rearward angle of inclination of the top surface 42 would provide unseparated airflow at the windshield header 48 and the leading edge of the trailer roof 34. It has been determined by wind tunnel tests that the angle theta of the top surface 42 should fall between the range of the angles alpha and beta. More particularly, an acceptable angle theta may be derived according to the formula $\theta = \frac{1}{2}(\alpha + B)$. As seen in FIG. 2 the major portion of the surface 42 is in a plane defined by the angle theta, with only the leading edge 48 deviating from the plane so as to be faired into the windshield header.

Figure 3:
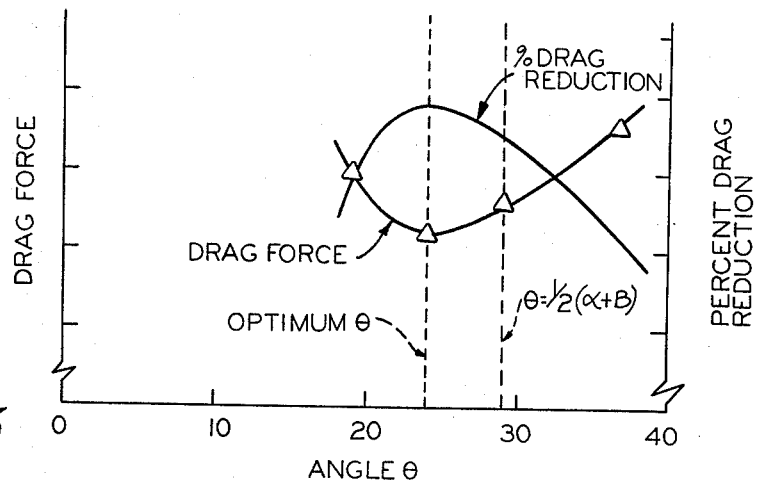
FIG. 3 is a plot of the angle of rearward inclination versus drag force and percent drag reduction for the drag reducing device of FIG. 1.

In FIG. 3, a graph is depicted which shows the effect of the angle of inclination theta of the top surface 42 on the aerodynamic drag. The graph shows data determined from actual wind tunnel tests on a one-seventh scale model of a GMC Astro 95 non-sleeper, cab-over-engine tractor with a 12 foot 6 inch trailer height (h2) and a 42 inch gap (w) between the cab of the tractor and the trailer. The graph plots the angle of inclination theta ($\theta$) against the drag force on the tractor-trailer and the attained percent drag reduction. The points at which test data were taken are designated by the triangles. Use of the design formula $\theta = \frac{1}{2}(\alpha + B)$ for this tractor-trailer combination provided an angle theta of 29°. As shown in the graph, actual wind tunnel tests showed the optimum angle to be about 24°, or 15 to 20 percent less than the angle theta derived from the ½ ($\alpha + B$) formula. It will be noted from the plot of FIG. 3 that the drag force reduction potential appears to be less sensitive to larger than optimum roof angles than it is to smaller than optimum angles. In view of this finding, a conservative approach was taken and the formula for theta was revised to $\theta = 0.425(\alpha + B)$. Substituting the parameters of FIG. 2 into this modified equation gives:

$$\theta = .425 \tan^{-1}\left\{\left[\left(\frac{h2-h1}{L}\right)\left[1 + \left(\frac{L}{l_d}\right)\right]\right] \Big/ \left[1 - \left(\frac{h2-h1}{L}\right)^2 \left(\frac{L}{l_d}\right)\right]\right\}$$

Figure 4:
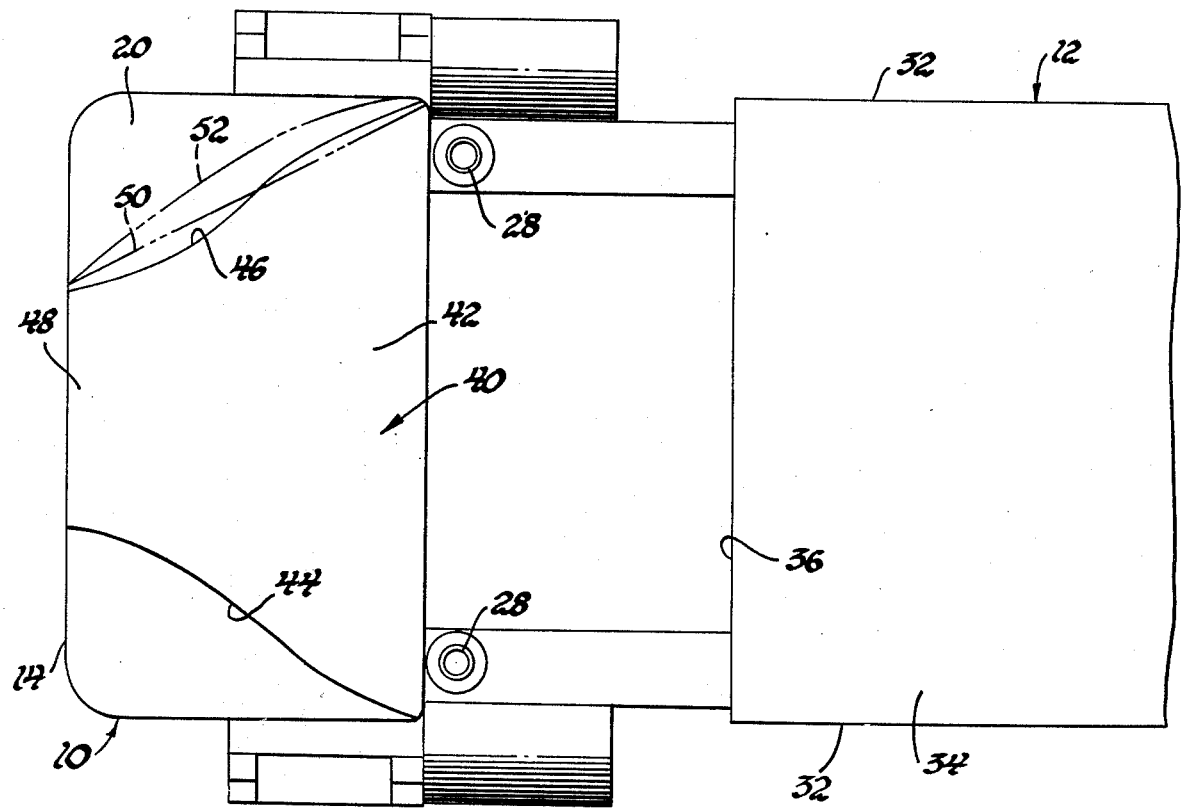
FIG. 4 is a plan view of the tractor-trailer vehicle of FIG. 1.

Referring to FIG. 4, the plan form of the drag reducing device 40 is shown. The leading edge 48 of the device 40 is 36 inches in width and the device diverges to the full 96 inch width of the roof 20 of cab 14 at its trailing edge. For a conventional cab-behind-engine tractor, the device would diverge to the full 96 inch trailer width at its trailing edge and would hang over the tractor sides at the rear. The sidewalls 44 and 46 of the drag reducing device 40 extend vertically and follow a curvilinear path which provides a concave-convex contour to the sidewalls 44 and 46. This concave-convex contour is effective in streamlining the airflow around the drag reducing device 40 and the top sidewalls 32 of the trailer, thereby effecting a reduction in aerodynamic drag greater than that provided by the top surface 42 of the device 40 alone. The concave-convex contour also permits considerable gains in drag reduction when the presence of crosswinds causes the relative wind to approach the vehicle from an angle relative to the direction of travel. As alternatives to the concave-convex contour of the sidewalls 44 and 46, tests have shown that similar drag reductions are accomplished if these sidewalls follow either the straight line as indicated by dash line 50 or the convex line indicated by dash line 52.

Figure 5:
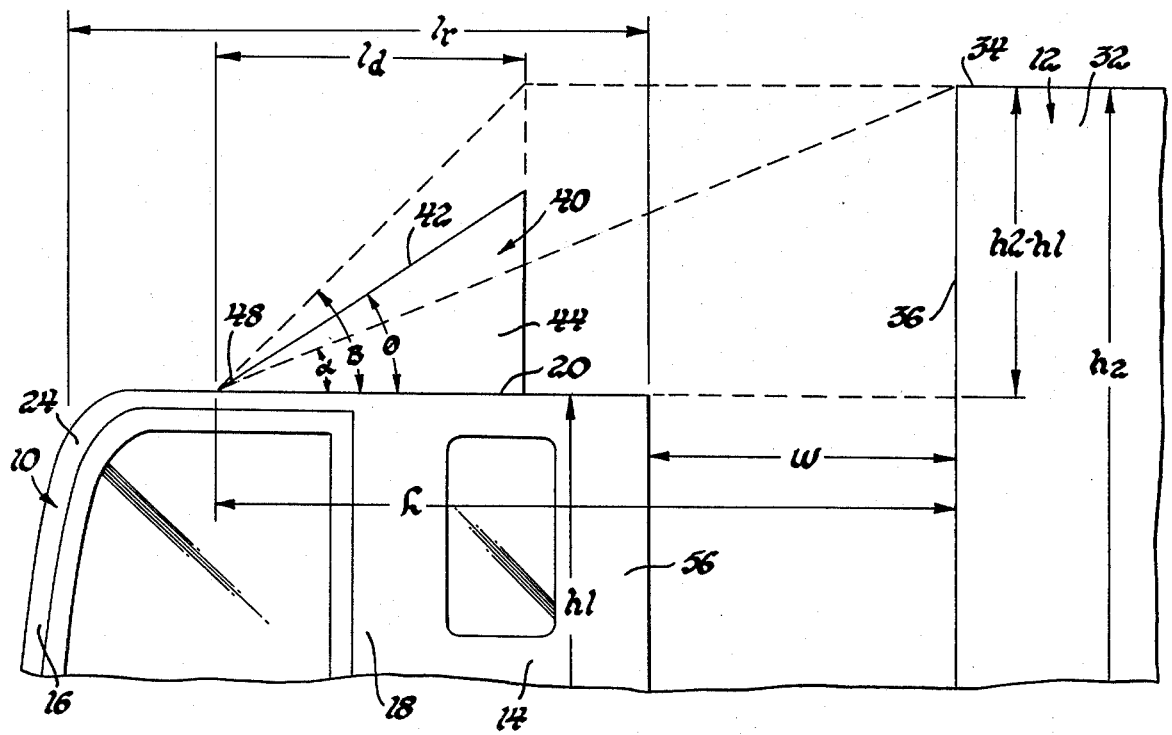
FIG. 5 is a partial side elevation view showing the invention mounted on a tractor having a sleeper cab.

The drag reducing device 40 of this invention is shown in FIGS. 1 and 2 as being the same length ($l_d$) as the roof of the tractor cab 14 ($l_r$). FIG. 5 shows the adaptation of the drag reducing device 40 of length ($l_d$) less than ($l_r$) to a tractor having a sleeper unit 56 which is housed in a rearward extension of the cab 14. The drag reducing device 40 may of course be the same length ($l_d$) as the sleeper cab roof 14, but it may be desirable to reduce the length of the device in order to minimize the proliferation of sizes needed to accommodate the very large number of possible combinations of tractors and trailers on the highways. The formula $\theta = 0.425(\alpha + B)$ may be used to calculate angle $\theta$ of the drag reducing device 40 of FIG. 5, as long as the length of the drag reducing device 40 ($l_d$) is less than the roof length ($l_r$) but is not less than ½ ($l_r$). Many roof mounting positions (L) and shield lengths ($l_d$) would be possible, a different angle $\theta$ being required for each location (L) and shield length ($l_d$). Alternatively a standard drag reducing device having a given angle $\theta$ and length ($l_d$) could be employed and its mounting location (L) on the roof 20 varied according to the formula. For example, for a given drag reducing device 40, $\theta$ and ($l_d$) would be known. The exposed trailer height (h2–h1), tractor roof length ($l_r$), and tractor to trailer gap (w) would be known for the particular tractor-trailer. The equation $\theta = 0.425(\alpha + B)$ could then be used to determine the mounting position (L) required for optimum drag reduction. The value of (L) locates the leading edge 48 of the drag reducing device relative to the trailer front wall 36.

Figure 6:
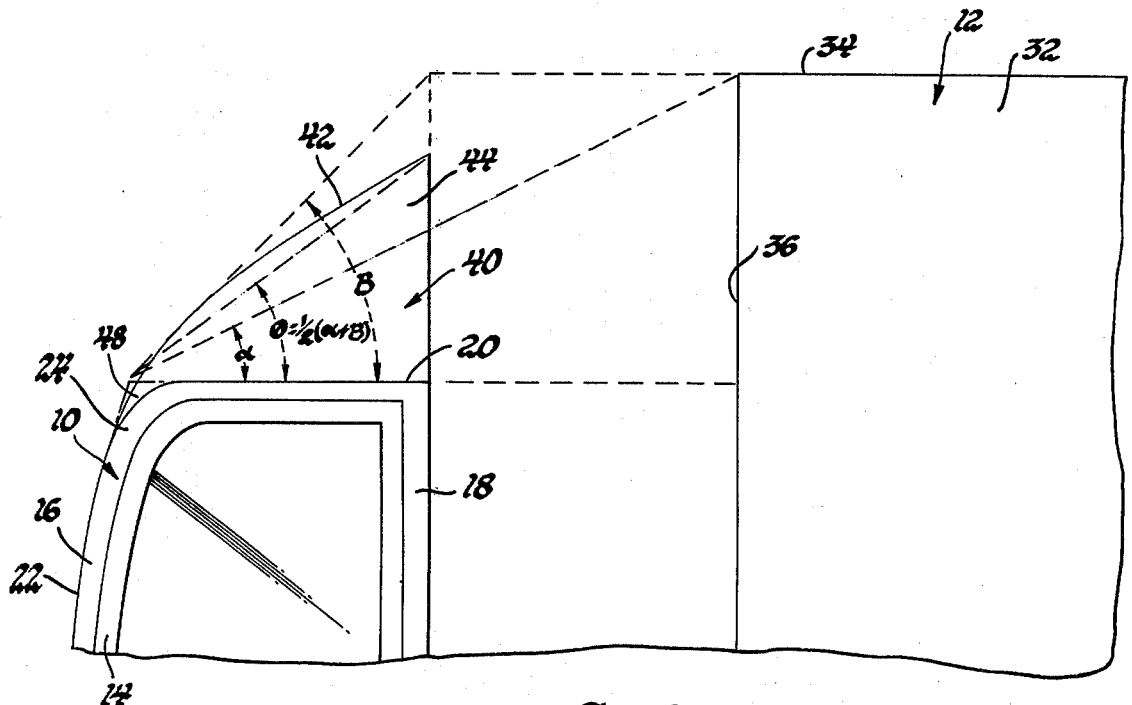
FIG. 6 is a view similar to FIG. 2 but showing a modified form of the drag reducing device.

FIG. 6 shows an alternative contour for the side elevation view of the drag reducing device 40. As seen in FIG. 6 the top surface 42 of the drag reducing device 40 follows a curvilinear path so as to provide a convex surface. The leading edge 48 of the device 40 is faired into the windshield header 24. The top surface 42 rises along the curved path to a point of tangency with a line drawn at angle B. The top surface 42 continues to rise but at a decreasing slope and then terminates at a point which intersects the line drawn at the angle $\theta$ as determined by the formula ½ ($\alpha + B$).

What is claimed is:

1. In combination with a tractor-trailer vehicle including a tractor roof having a leading edge and a trailing edge and a trailer body including a forward wall spaced rearwardly of the trailing edge of the tractor roof and a trailer roof having a leading edge at an elevation greater than the tractor roof, an aerodynamic drag reducer mounted on the tractor roof and comprising: a generally wedge shaped drag reducing device with side surfaces and a top surface having a leading edge and a trailing edge, the leading edge of the device being faired into the tractor roof and the top surface extending rearwardly therefrom and diverging upwardly from the tractor roof to streamline airflow around the tractor and over the trailer roof, the angle of inclination of the top surface relative the tractor roof being such that the surface thereof falls between an angle alpha which is defined by the tractor roof and a line drawn from the leading edge of the device to the leading edge of the trailer roof and an angle beta which is defined by the tractor roof and a line drawn between the leading edge of the device and the intersection of a vertical projection of the trailing edge of the device and a horizontal projection of the leading edge of the trailer roof, the leading edge of the device being of lesser width than the width of the tractor roof, the side surface extending generally vertically between the top surface of the device and the tractor roof and diverging toward the respective outboard edges of the tractor roof, the juncture of the side surface with the top surface of the tractor roof following a curvilinear path providing a concave-convex contour to the side walls to streamline airflow around the tractor and to divert air smoothly around the sides of the trailer to reduce aerodynamic drag on the tractor-trailer vehicle.

2. In a tractor-trailer vehicle including a tractor roof having a leading edge and a trailing edge and a trailer body includng a forward wall spaced rearwardly of the trailing edge of the tractor roof and a roof having a leading edge at an elevation greater than the trailing edge of the tractor roof, the improvement comprising: an aerodynamic drag reducing device mounted on the tractor roof, said drag reducing device being generally wedge shaped with a top surface and side surfaces and having a leading edge and a trailing edge, the leading edge of the device being faired into the tractor roof and the top surface extending rearwardly therefrom and diverging upwardly from the tractor roof to streamline airflow around the tractor and over the trailer roof, the top surface following a curvilinear path extending rearwardly from the leading edge to a point of tangency with a line drawn between the leading edge of the device and the intersection of a vertical projection of the trailing edge of the device and a horizontal extension of the leading edge of the trailer roof, the top surface of the device continuing rearwardly beyond the point of tangency and terminating at a point intersecting a line drawn at an angle ($\theta$) according to the formula $\theta = $ ½ ($\alpha + B$) where ($\alpha$) is the angle whose tangent is defined as ($h2-h1$)/(L), (B) is the angle whose tangent is defined as ($h2-h1/l_d$), ($h1$) is the height of the tractor roof above ground, ($h2$) is the height of the trailer roof above ground, ($l_d$) is the length of the drag reducing device, and (L) is the distance from the leading edge of the device to the forward wall of the trailer, the leading edge of the device being of lesser width than the width of the tractor roof, and the side surfaces extending vertically between the top surface of the device and the tractor roof and diverging toward the respective outboard edges of the tractor to streamline airflow around the tractor and the device and smoothly around the sides of the trailer.

3. In a tractor-trailer vehicle including a tractor roof at a lower elevation than the trailer roof and spaced forwardly of the front wall of the trailer, the improvement comprising: an aerodynamic drag reducing device mounted on the tractor roof, said drag reducing device being generally wedge shaped with a top surface and side surfaces and having leading and trailing edges, the leading edge of the device being faired into the tractor roof and the top surface extending rearwardly therefrom and diverging upwardly from the tractor roof to streamline airflow around the tractor and over the trailer roof, the top surface being inclined at an angle theta according to the formula $$\theta = .425 \, \text{Tan}^{-1} \left\{ \left[ \left( \frac{h2-h1}{L} \right) \right] \left[ 1 + \left( \frac{L}{l_d} \right) \right] \bigg/ \left[ 1 - \left( \frac{h2-h1}{L} \right)^2 \left( \frac{L}{l_d} \right) \right] \right\}$$

where ($h1$) is the height of the tractor roof above ground, ($h2$) is the height of the trailer roof above ground, ($l_d$) is the length of the drag reducer and (L) is the distance from the leading edge of the device to the front wall of the trailer, the leading edge of the device being of lesser width than the width of the tractor roof, the side surface extending generally vertically between the top surface of the device and the tractor roof and diverging toward the respective outboard edges of the tractor roof, the juncture of the side surface with the top surface of the tractor roof following a curvilinear path providing a concave-convex contour to the side walls to streamline airflow around the tractor and to divert air smoothly around the sides of the trailer to reduce aerodynamic drag on the tractor-trailer vehicle.

4. In a tractor-trailer vehicle including a tractor roof having a leading edge and a trailing edge and a trailer body including a forward wall spaced rearwardly of the trailing edge of the tractor roof and a roof having a leading edge at an elevation greater than the trailing edge of the tractor roof, the improvement comprising: an aerodynamic drag reducing device mounted on the tractor roof, said drag reducing device being generally wedge shaped with a top surface and side surfaces and having a leading edge and a trailing edge, the leading edge of the device being faired into the tractor roof and the top surface extending rearwardly therefrom and diverging upwardly from the tractor roof to streamline airflow around the tractor and over the trailer roof, the top surface following a curvilinear path extending rearwardly from the leading edge to a point of tangency with a line drawn between the leading edge of the device and the intersection of a vertical projection of the trailing edge of the device and a horizontal extension of the leading edge of the trailer roof, the top surface of the device continuing rearwardly beyond the point of tangency and terminating at a point intersecting a line drawn at an angle ($\theta$) according to the formula $\theta = \frac{1}{2}(\alpha + B)$ where ($\alpha$) is the angle whose tangent is defined as $(h2-h1)/(L)$, (B) is the angle whose tangent is defined as $(h2-h1/l_d)$, ($h1$) is the height of the tractor roof above ground, ($h2$) is the height of the trailer roof above ground, ($l_d$) is the length of the drag reducing device, and (L) is the distance from the leading edge of the device to the forward wall of the trailer, the leading edge of the device being of lesser width than the width of the tractor roof, the side surface extending generally vertically between the top surface of the device and the tractor roof and diverging toward the respective outboard edges of the tractor roof, the juncture of the side surface with the top surface of the tractor roof following a curvilinear path providing a concave-convex contour to the side walls to streamline airflow around the tractor and to divert air smoothly around the sides of the trailer to reduce aerodynamic drag on the tractor-trailer vehicle.

* * * * *